(12) United States Patent
Kondrashev et al.

(10) Patent No.: US 12,669,066 B2
(45) Date of Patent: Jun. 30, 2026

(54) BTT PROBE FIXING APPARATUS AND GAS TURBINE INCLUDING SAME

(71) Applicant: DOOSAN ENERBILITY CO., LTD., Changwon (KR)

(72) Inventors: Iurii Kondrashev, Gimhae (KR); Sung Hyun Kim, Gimhae (KR); Sam Sik Nam, Changwon (KR); Keun Won Choi, Changwon (KR)

(73) Assignee: DOOSAN ENERBILITY CO., LTD, Changwon (KR)

( * ) Notice: Subject to any disclaimer, the term of this patent is extended or adjusted under 35 U.S.C. 154(b) by 0 days.

(21) Appl. No.: 19/302,020

(22) Filed: Aug. 17, 2025

(65) Prior Publication Data

US 2026/0063046 A1 Mar. 5, 2026

(30) Foreign Application Priority Data

Sep. 3, 2024 (KR) ........................ 10-2024-0119538

(51) Int. Cl.
| | |
|---|---|
| *F01D 21/00* | (2006.01) |
| *F02C 6/00* | (2006.01) |
| *G01M 15/02* | (2006.01) |
| *G01M 15/14* | (2006.01) |

(52) U.S. Cl.
CPC .............. *F01D 21/003* (2013.01); *F02C 6/00* (2013.01); *G01M 15/02* (2013.01); *G01M 15/14* (2013.01); *F05D 2260/83* (2013.01)

(58) Field of Classification Search
CPC ...... F01D 21/003; G01M 15/02; G01M 15/14
See application file for complete search history.

(56) References Cited

U.S. PATENT DOCUMENTS

| | | | | |
|---|---|---|---|---|
| 4,018,083 | A | * | 4/1977 | Hoffman ................ G01H 1/003 73/660 |
| 4,132,114 | A | | 1/1979 | Shah |
| 5,185,996 | A | | 2/1993 | Smith |
| 6,037,581 | A | | 3/2000 | Zorner |
| 7,231,817 | B2 | | 6/2007 | Smed |
| 9,181,818 | B2 | | 11/2015 | Warren |

(Continued)

FOREIGN PATENT DOCUMENTS

| | | |
|---|---|---|
| CN | 116412896 A | 7/2023 |
| DE | 10-2005-060961 B4 | 2/2011 |

(Continued)

*Primary Examiner* — Phutthiwat Wongwian
*Assistant Examiner* — Jacek Lisowski
(74) *Attorney, Agent, or Firm* — Harvest IP Law, LLP

(57) ABSTRACT

The BTT probe fixing apparatus includes a cooling sleeve inserted into a fixing hole formed in a vane carrier, the cooling sleeve accommodating a BTT probe measuring vibration of a blade therein, and the cooling sleeve having a lower end thereof fastened to the fixing hole. Furthermore, the BTT probe fixing apparatus includes a probe holder having a lower end fastened to a penetration hole formed in a casing and having an inner portion where the cooling sleeve penetrates therethrough and is inserted thereinto such that the cooling sleeve is capable of being slid in the probe holder, the probe holder being configured to move according to thermal expansion of the casing while maintaining the cooling sleeve and the BTT probe in a fixed position relative to the vane carrier.

20 Claims, 7 Drawing Sheets

(56) References Cited

U.S. PATENT DOCUMENTS

| | | | |
|---|---|---|---|
| 2007/0063712 A1 | 3/2007 | Crum | |
| 2007/0257676 A1* | 11/2007 | Sacher | G01R 33/3415 |
| | | | 324/318 |
| 2015/0199805 A1 | 7/2015 | Hatcher, Jr. | |
| 2016/0100503 A1 | 4/2016 | Miguel | |
| 2019/0383158 A1* | 12/2019 | Diwinsky | F01D 17/02 |

FOREIGN PATENT DOCUMENTS

| | | | |
|---|---|---|---|
| JP | H07190903 | A | 7/1995 |
| JP | 2000-234953 | A | 8/2000 |
| JP | 2003-232673 | A | 8/2003 |
| JP | 2011-007678 | A | 1/2011 |
| JP | 2012-087655 | A | 5/2012 |
| JP | 2012-087784 | A | 5/2012 |
| KR | 10-1174211 | B1 | 8/2012 |
| KR | 10-1204974 | B1 | 11/2012 |
| KR | 10-1237225 | B1 | 2/2013 |
| KR | 10-1608130 | B1 | 3/2016 |
| KR | 10-1915793 | B1 | 11/2018 |

* cited by examiner

BTT PROBE FIXING APPARATUS AND GAS TURBINE INCLUDING SAME

CROSS REFERENCE TO RELATED APPLICATION

The present application claims priority to Korean Patent Application No. 10-2024-0119538, filed Sep. 3, 2024, the entire contents of which are incorporated herein for all purposes by this reference.

BACKGROUND

Technical Field

The present disclosure relates to a Blade Tip Timing (BTT) probe fixing apparatus for stably fixing and maintaining a BTT probe that monitors a blade in real time, and relates to a gas turbine including the BTT probe fixing apparatus.

Description of the Related Art

A turbine is a mechanical apparatus that obtains a rotational force by an impulsive force or reaction force using a flow of a compressible fluid such as steam or gas. The turbine includes a steam turbine using a steam and a gas turbine using a high temperature combustion gas.

Among the steam turbine and the gas turbine, the gas turbine is mainly composed of a compressor, a combustor, and a turbine. The compressor is provided with an air inlet for introducing air, and a plurality of compressor vanes and a plurality of compressor blades are alternately arranged in a compressor housing.

The combustor supplies fuel to the compressed air compressed in the compressor and ignites a fuel-air mixture with a burner, thereby producing a high-temperature and high-pressure combustion gas.

The turbine has a plurality of turbine vanes and a plurality of turbine blades disposed alternately in a turbine casing. In addition, a rotor is arranged such that the rotor passes through centers of the compressor, the combustor, the turbine, and an exhaust chamber.

Both ends of the rotor are rotatably supported by bearings. In addition, a plurality of disks are fixed to the rotor so that respective blades connected to the disks are connected to each other, and a drive shaft such as a generator is connected to an end portion of the exhaust chamber.

Since such a gas turbine has no reciprocating mechanism such as a piston in a 4-stroke engine, so that there is no mutual frictional part such as a piston-cylinder. Therefore, the gas turbine has advantages in that consumption of lubricating oil is extremely small, amplitude as a characteristic of a reciprocating machine is greatly reduced, and high speed operation is possible.

Briefly describing the operation of the gas turbine, the compressed air in the compressor is mixed with fuel and combusted to produce a high-temperature combustion gas, and the combustion gas is injected toward the turbine. The injected combustion gas passes through the turbine vanes and the turbine blades to generate a rotational force, so that the rotor is rotated.

Document of Related Art (Patent Document 1) Korean Patent No. 10-1237225

SUMMARY

Accordingly, the present disclosure has been made keeping in mind the above problems occurring in the related art, and an objective of the present disclosure is to provide a Blade Tip Timing (BTT) probe fixing apparatus for stably fixing and maintaining a BTT probe that monitors a blade in real time, and to provide a gas turbine including the BTT probe fixing apparatus.

According to an aspect of the present disclosure, there is provided a Blade Tip Timing (BTT) probe fixing apparatus including: a cooling sleeve inserted into a fixing hole formed in a vane carrier, the cooling sleeve accommodating a BTT probe measuring vibration of a blade in an inner portion of the cooling sleeve, and the cooling sleeve having a lower end thereof fastened to the fixing hole; and a probe holder having a lower end thereof fastened to a penetration hole formed in a casing and having an inner portion where the cooling sleeve penetrates therethrough and is inserted thereinto such that the cooling sleeve is capable of being slid in the probe holder, the probe holder being configured to move according to thermal expansion of the casing while maintaining the cooling sleeve and the BTT probe in a fixed position relative to the vane carrier.

In the BTT probe fixing apparatus according to an aspect of the present disclosure, the cooling sleeve may be formed of a flexible material, so that the cooling sleeve is capable of being bent by an external force and is capable of being restored when the external force is removed.

In the BTT probe fixing apparatus according to an aspect of the present disclosure, the cooling sleeve may include an Inconel alloy.

In the BTT probe fixing apparatus according to an aspect of the present disclosure, the probe holder may include: a main body formed in a hollow cylindrical shape; a bolt portion inserted into and fastened to a fastening hole formed in an upper portion of the main body; and a bolt adapter portion mounted on a lower portion of the bolt portion inside the main body, and wherein the cooling sleeve may be mounted such that the cooling sleeve is capable of being slid up and down inside the main body, the bolt portion, and the bolt adapter portion.

In the BTT probe fixing apparatus according to an aspect of the present disclosure, the main body may include: an insertion portion, positioned at a lower side of the main body, which is capable of being inserted into and fastened to the penetration hole and which has a first outer diameter; a fixing portion, positioned at an upper side of the main body, which has a second outer diameter that is larger than the first outer diameter; and an outer stepped portion formed on a boundary surface between the insertion portion and the fixing portion.

In the BTT probe fixing apparatus according to an aspect of the present disclosure, an inner gasket may be mounted on a lower surface of the bolt adapter portion, and an outer gasket may be mounted between the outer stepped portion and the casing, thereby being capable of preventing leakage of fluid from inside the casing to the outside.

In the BTT probe fixing apparatus according to an aspect of the present disclosure, the fixing portion may include an inner stepped portion, and the inner gasket may be positioned between the bolt adapter portion and the inner stepped portion. The inner gasket may be configured to seal a gap between the cooling sleeve and the bolt adapter portion and a gap between the bolt adapter portion and the inner stepped portion.

In the BTT probe fixing apparatus according to an aspect of the present disclosure, the outer stepped portion may include a recessed portion recessed upwardly, and the outer gasket may be positioned at the recessed portion. The outer gasket may be configured to seal a gap between the main body and the casing.

In the BTT probe fixing apparatus according to an aspect of the present disclosure, the BTT probe fixing apparatus may further include a three-way connection port configured to introduce external air and to direct the external air to flow toward the cooling sleeve.

In the BTT probe fixing apparatus according to an aspect of the present disclosure, the blade may be a compressor blade or a turbine blade.

In the BTT probe fixing apparatus according to an aspect of the present disclosure, the vane carrier may be a compressor vane carrier or a turbine vane carrier.

In the BTT probe fixing apparatus according to an aspect of the present disclosure, the casing may be a compressor casing or a turbine casing.

According to an aspect of the present disclosure, there is provided a gas turbine including: a compressor configured to draw in and compress external air; a combustor configured to mix fuel with air compressed in the compressor and to combust a mixture of fuel and the compressed air; a turbine configured to generate power by using a combustion gas discharged from the combustor; and a Blade Tip Timing (BTT) probe fixing apparatus for fixing and maintaining a BTT probe that monitors a blade in real time. Here, the BTT probe fixing apparatus may include: a cooling sleeve inserted into a fixing hole formed in a vane carrier, the cooling sleeve accommodating the BTT probe measuring vibration of the blade in an inner portion of the cooling sleeve, and the cooling sleeve having a lower end thereof fastened to the fixing hole; and a probe holder having a lower end thereof fastened to a penetration hole formed in a casing and having an inner portion where the cooling sleeve penetrates therethrough and is inserted thereinto such that the cooling sleeve is capable of being slid in the probe holder, the probe holder being configured to move according to thermal expansion of the casing while maintaining the cooling sleeve and the BTT probe in a fixed position relative to the vane carrier.

In the gas turbine according to an aspect of the present disclosure, the cooling sleeve may be formed of a flexible material, so that the cooling sleeve is capable of being bent by an external force and is capable of being restored when the external force is removed.

In the gas turbine according to an aspect of the present disclosure, the cooling sleeve may include an Inconel alloy.

In the gas turbine according to an aspect of the present disclosure, the probe holder may include: a main body formed in a hollow cylindrical shape; a bolt portion inserted into and fastened to a fastening hole formed in an upper portion of the main body; and a bolt adapter portion mounted on a lower portion of the bolt portion inside the main body, and wherein the cooling sleeve is mounted such that the cooling sleeve is capable of being slid up and down inside the main body, the bolt portion, and the bolt adapter portion.

In the gas turbine according to an aspect of the present disclosure, the main body may include: an insertion portion, positioned at a lower side of the main body, which is capable of being inserted into and fastened to the penetration hole and which has a first outer diameter; a fixing portion, positioned at an upper side of the main body, and which has a second outer diameter that is larger than the first outer diameter; and a outer stepped portion formed on a boundary surface between the insertion portion and the fixing portion.

In the gas turbine according to an aspect of the present disclosure, an inner gasket may be mounted on a lower surface of the bolt adapter portion, and an outer gasket may be mounted between the outer stepped portion and the casing, thereby being capable of preventing leakage of fluid from inside the casing to the outside.

In the gas turbine according to an aspect of the present disclosure, the fixing portion may include an inner stepped portion, and the inner gasket may be positioned between the bolt adapter portion and the inner stepped portion. The inner gasket may be configured to seal a gap between the cooling sleeve and the bolt adapter portion and a gap between the bolt adapter portion and the inner stepped portion.

In the gas turbine according to an aspect of the present disclosure, the outer stepped portion may include a recessed portion recessed upwardly, and the outer gasket may be positioned at the recessed portion. The outer gasket may be configured to seal a gap between the main body and the casing.

In the gas turbine according to an aspect of the present disclosure, the gas turbine may further include a three-way connection port configured to introduce external air and to direct the external air to flow toward the cooling sleeve.

In the gas turbine according to an aspect of the present disclosure, the blade may be a compressor blade or a turbine blade.

In the gas turbine according to an aspect of the present disclosure, the vane carrier may be a compressor vane carrier or a turbine vane carrier.

In the gas turbine according to an aspect of the present disclosure, the casing may be a compressor casing or a turbine casing.

Other details of implementations according to various aspects of the present disclosure are included in the detailed description below.

According to an embodiment of the present disclosure, the BTT probe that monitors the blade in real time is capable of being stably fixed and maintained.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION

Figure 1:
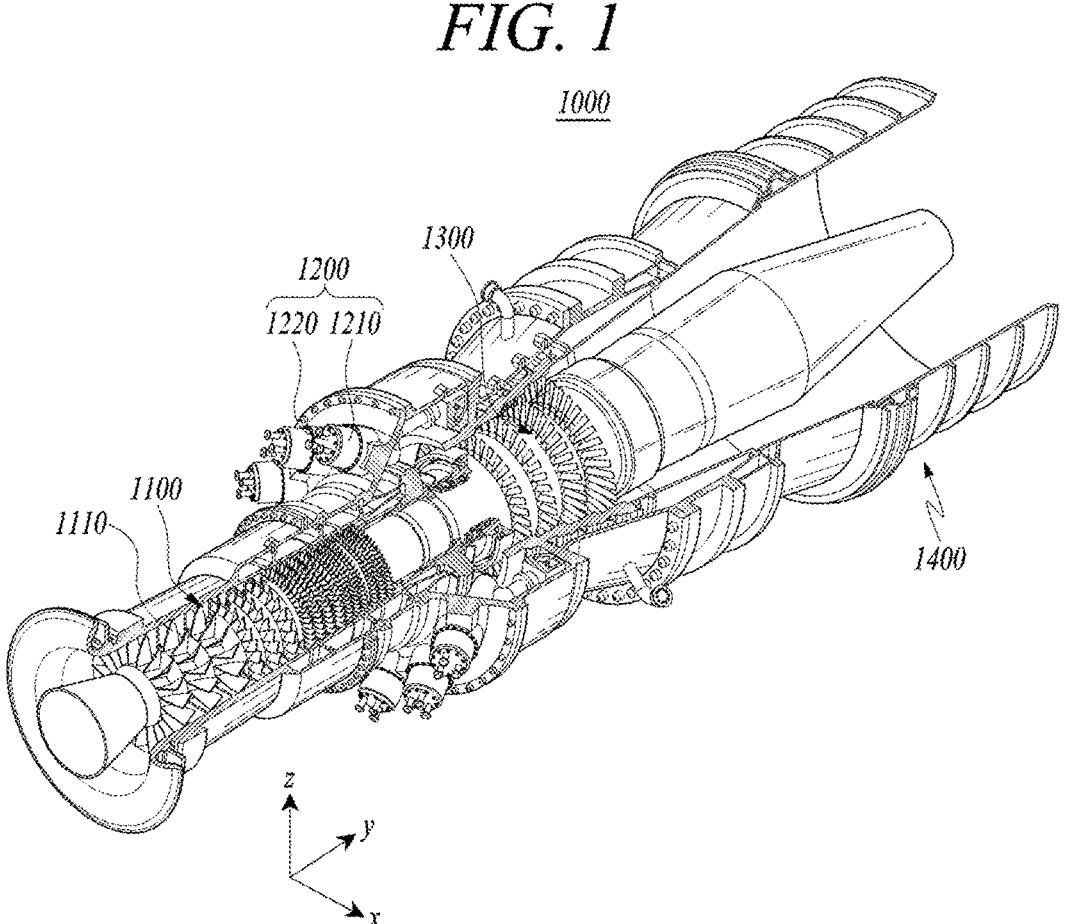
FIG. 1 is a partially cut-away perspective view of a gas turbine according to an embodiment of the present disclosure.

Various modifications and different embodiments will be described below in detail with reference to the accompanying drawings so that those skilled in the art can easily carry out the present disclosure. It should be understood, however, that the present disclosure is not intended to be limited to the specific embodiments, but the present disclosure includes all modifications, equivalents or replacements that fall within the spirit and scope of the disclosure as defined in the following claims.

The terminology used herein is for the purpose of describing specific embodiments only and is not intended to limit the scope of the present disclosure. Singular expressions include plural expressions unless the context clearly indicates otherwise. In the present disclosure, terms such as "comprises", "includes", or "have/has" should be construed as designating that there are such features, integers, steps, operations, components, parts, and/or combinations thereof, not to exclude the presence or possibility of adding of one or more of other features, integers, steps, operations, components, parts, and/or combinations thereof.

Hereinafter, exemplary embodiments of the present disclosure will be described below in detail with reference to the accompanying drawings. It should be noted that like reference numerals refer to like parts throughout various drawings and exemplary embodiments. Furthermore, detailed descriptions related to well-known functions or configurations may be omitted in order not to unnecessarily obscure subject matters of the present disclosure. For the same reason, some components may be exaggerated, omitted, or schematically illustrated in the accompanying drawings.

Figure 2:
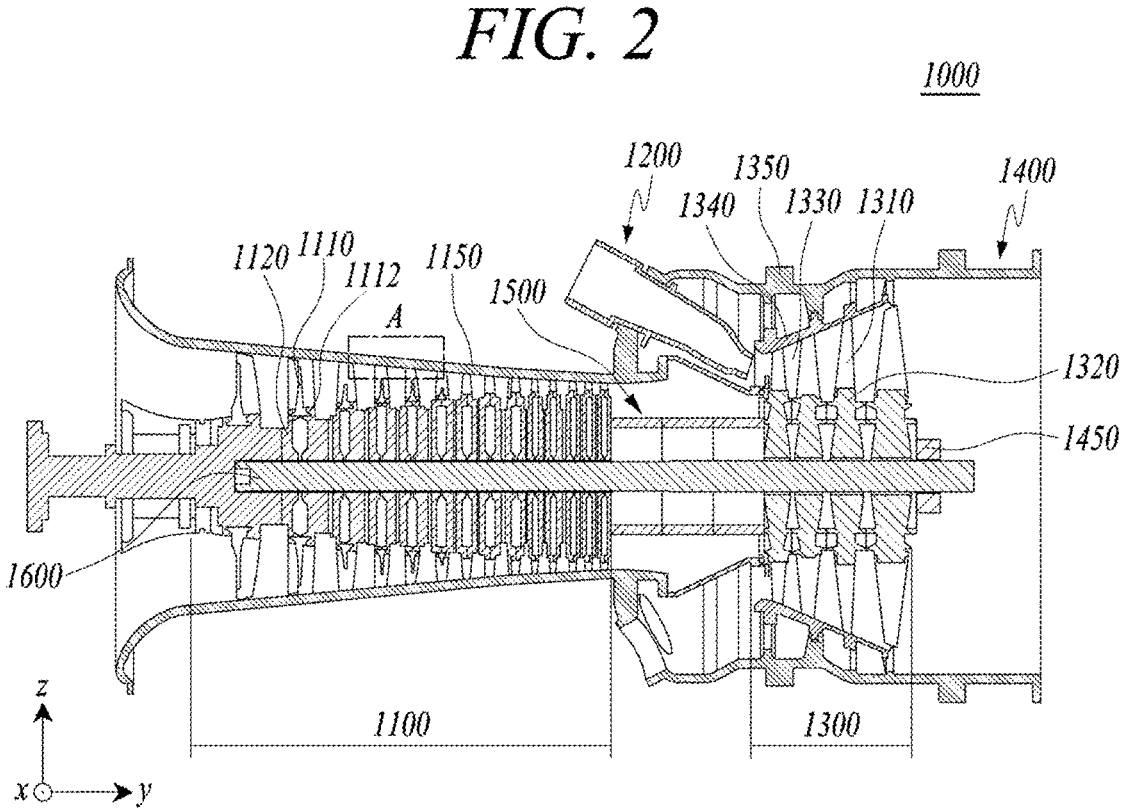
FIG. 2 is a cross-sectional view illustrating a schematic structure of the gas turbine according to an embodiment of the present disclosure.
Figure 3:
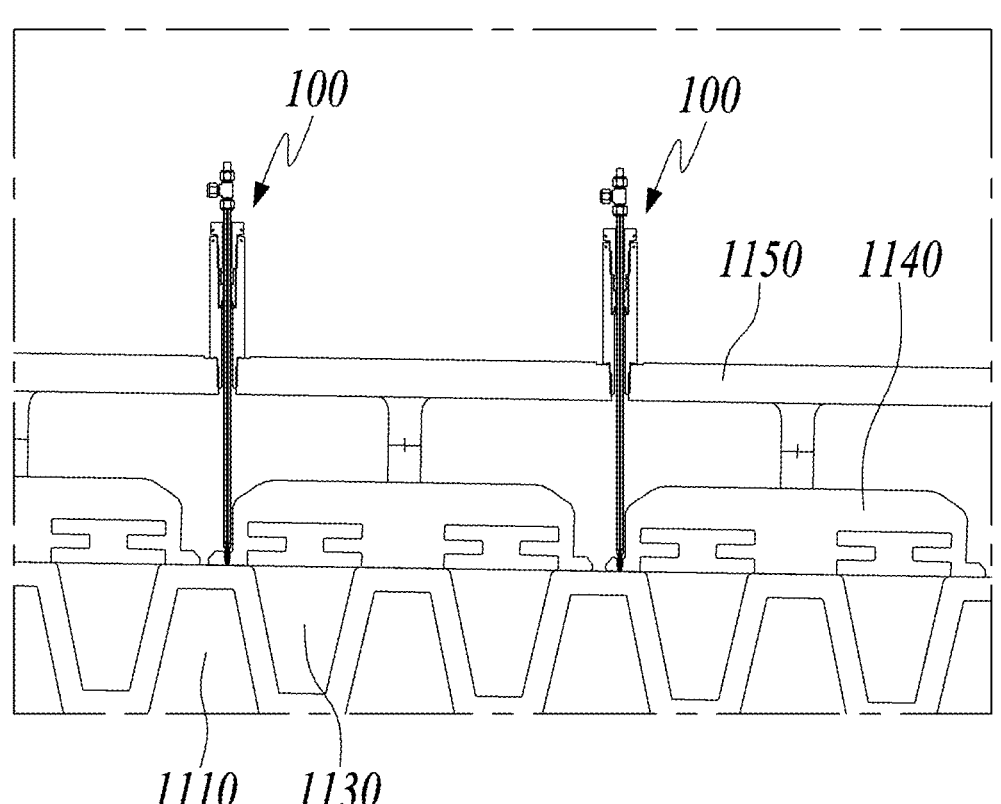
FIG. 3 is a partially enlarged cross-sectional view of part A in FIG. 2.

FIG. 1 is a partially cut-away perspective view of a gas turbine according to an embodiment of the present disclosure, FIG. 2 is a cross-sectional view illustrating a schematic structure of the gas turbine according to an embodiment of the present disclosure, and FIG. 3 is a partially enlarged cross-sectional view of part A in FIG. 2.

As illustrated in FIG. 1, a gas turbine 1000 according to an embodiment of the present disclosure includes a compressor 1100, a combustor 1200, and a turbine 1300. The compressor 1100 is provided with a plurality of compressor blades 1110 mounted radially. The compressor 1100 rotates the compressor blades 1110, and air is compressed and flows by the rotation of the compressor blades 1110. The sizes and installation angles of the compressor blades 1110 may vary according to the installation positions of the compressor blades 1110. In an embodiment, the compressor 1100 may be directly or indirectly connected to the turbine 1300, and may receive a portion of the power generated from the turbine 1300 and may rotate the compressor blades 1110.

Air compressed from the compressor 1100 flows to the combustor 1200. The combustor 1200 includes a plurality of combustion chambers 1210 and a plurality of fuel nozzle modules 1220 disposed annularly.

As illustrated in FIG. 2, the gas turbine 1000 is provided with a compressor casing 1150, and a diffuser 1400 to which a combustion gas passing through the turbine is provided on a rear side of the compressor casing 1150. In addition, the combustor 1200 configured to receive and combust compressed air supplied thereto is disposed in front of the diffuser 1400.

In describing the present disclosure on the basis of a flow direction of air, the compressor 1100 is positioned on an upstream side, and the turbine 1300 is disposed on a downstream side. In addition, a torque tube 1500 as a torque transmission member that transmits the rotational torque generated from the turbine 1300 to the compressor 1100 is disposed between the compressor 1100 and the turbine 1300.

The compressor 1100 is provided with a plurality of compressor rotor disks 1120 (for example, 14 compressor rotor disks), and each of the compressor rotor disks 1120 is fastened by a tie rod 1600 such that each of the compressor rotor disks 1120 is not spaced apart in an axial direction.

Specifically, each of the compressor rotor disks 1120 is aligned along the axial direction while being in a state in which the tie rod 1600 constituting a rotary shaft passes approximately through a central portion of each of the compressor rotor disks 1120. Here, adjacent compressor rotor disks 1120 are disposed such that facing surfaces thereof are in tight contact with each other by the tie rod 1600 so that the adjacent compressor rotor disks 1120 cannot rotate relative to each other.

The plurality of compressor blades 1110 are radially coupled to each outer circumferential surface of each of the compressor rotor disks 1120. Each of the compressor blades 1110 is provided with a dovetail portion 1112, and is fastened to each of the compressor rotor disks 1120.

Compressor vanes 1130 fixed to and disposed in a housing are positioned between each of the compressor rotor disks 1120. Unlike the rotor disks, the compressor vanes 1130 are fixed such that the compressor vanes 1130 do not rotate, and the compressor vanes 1130 serve to align the flow of compressed air that has passed through the compressor blades 1110 of the compressor rotor disks 1120 so that the air is guided to the compressor blades 1110 positioned at the downstream side.

The compressor vanes 1130 are fixed to a compressor vane carrier 1140, and the compressor vane carrier 1140 is fixed to the compressor casing 1150. In addition, a Blade Tip Timing (BTT) probe fixing apparatus 100 is mounted across the compressor vane carrier 1140 and the compressor casing 1150. The BTT probe fixing apparatus 100 will be described later with reference to FIG. 4 to FIG. 7.

The tie rod 1600 is disposed such that the tie rod 1600 passes through central portions of the plurality of compressor rotor disks 1120 and a plurality of turbine rotor disks 1320, and the tie rod 1600 may be provided as a single tie rod or a plurality of tie rods. That is, the shape in which one tie rod 1600 passes through the central portions of the rotor disks may be realized, another shape in which a plurality of tie rods is arranged circumferentially may be realized, or a combination of the two shapes described above may be realized.

The combustor 1200 mixes fuel with the introduced compressed air, burns a fuel-air mixture to produce high-temperature and high-pressure combustion gas with high energy, and increases the temperature of the combustion gas to a temperature at which the combustor and the turbine components are able to be resistant to heat through an isobaric combustion process.

A plurality of combustors constituting a combustion system of the gas turbine may be arranged in the housing in a form of a cell. Each of the combustors may include a burner having a fuel injection nozzle and so on, a combustor liner forming a combustion chamber, and a transition piece serving as a connection part between the combustor and the turbine.

In detail, the combustor liner provides a combustion space in which fuel injected by the fuel injection nozzle is mixed with the compressed air supplied from the compressor and combusted. Such a combustor liner may include a flame container providing the combustion space in which fuel mixed with air is combusted, and may include a flow sleeve forming an annular space while surrounding the flame container. In addition, the fuel injection nozzle is coupled to a front end of the combustor liner, and an ignition plug is coupled to a side wall of the combustor liner.

The transition piece is connected to a rear end of the combustor liner such that the combustion gas combusted by the ignition plug is capable of being transferred toward the turbine. An outer wall of such a transition piece is cooled by compressed air supplied from the compressor so as to prevent the transition piece from being damaged due to the high temperature of the combustion gas.

To this end, the transition piece is provided with holes for cooling such that air is capable of being injected into the inside of the transition piece through the holes, and the compressed air cools the inside of the transition piece and then flows toward the combustor liner.

The compressed air that has cooled the transition piece may flow into an annular space of the combustor liner, and may be supplied as a cooling air through the holes formed in the flow sleeve from the outside of the flow sleeve to an outer wall of the combustor liner.

The high-temperature and high-pressure combustion gas ejected from the combustor is supplied to the turbine 1300. The supplied high-temperature and high-pressure combustion gas expands and applies impingement or reaction force to a turbine rotation wing to generate rotational torque. A portion of the obtained rotational torque is transmitted via the torque tube 1500 to the compressor, and the remaining portion which is the excessive torque is used to drive a generator and so on.

The turbine 1300 basically has a structure similar to the compressor. That is, the turbine 1300 includes the plurality of turbine rotor disks 1320 similar to the compressor rotor disks of the compressor. Therefore, the plurality of turbine rotor disks 1320 also includes a plurality of turbine blades 1310 arranged radially. The turbine blades 1310 may also be coupled to the turbine rotor disks 1320 in a dovetail coupling manner or the like.

In addition, turbine vanes 1330 fixed to a turbine casing 1350 through a turbine vane carrier 1340 is provided between the turbine blades 1310, so that a flow direction of the combustion gas passing through the blades is guided. At least one turbine vane 1330 is mounted in the turbine vane carrier 1340, and the turbine vane carrier 1340 is connected to the turbine casing 1350.

By a turbine vane platform coupled to an inner end portion and an outer end portion of the turbine vane 1330, the turbine vane 1330 is mounted fixedly in the turbine casing 1350. On the other hand, a ring segment (not illustrated) is mounted on a position of the inside of the turbine casing 1350 facing a blade tip 1311 that is an outer end portion of the rotated turbine blade 1310 such that a predetermined gap is formed between the ring segment and the blade tip 1311.

The ring segment prevents leakage of the high-temperature and high-pressure combustion gas that rotates the rotor, thereby increasing the efficiency of the gas turbine. The ring segment is mounted in the turbine vane carrier 1340 accommodating the turbine blade 1310 such that the ring segment surrounds an outer periphery of the turbine blade 1310.

Meanwhile, the blades (the compressor blade 1110 and the turbine blades 1310, which are hereinafter collectively referred to as "blades") that significantly affect the reliability and the efficiency of the gas turbine are operated under a maximum load condition. The blade is a part in which damage occurs frequently, and most of the damage may be a fatigue destruction due to vibration of the blade or may be a corrosion. Therefore, in order to prevent such damage in advance, it is very important to measure and monitor a behavior of the blade while the gas turbine is operated.

Accordingly, in the present disclosure, a BTT probe fixing apparatus for stably fixing and maintaining a BTT probe that monitors the blade in real time is disclosed. Such a BTT probe fixing apparatus 100 will be described with reference to FIG. 4 and FIG. 5.

Figure 4:
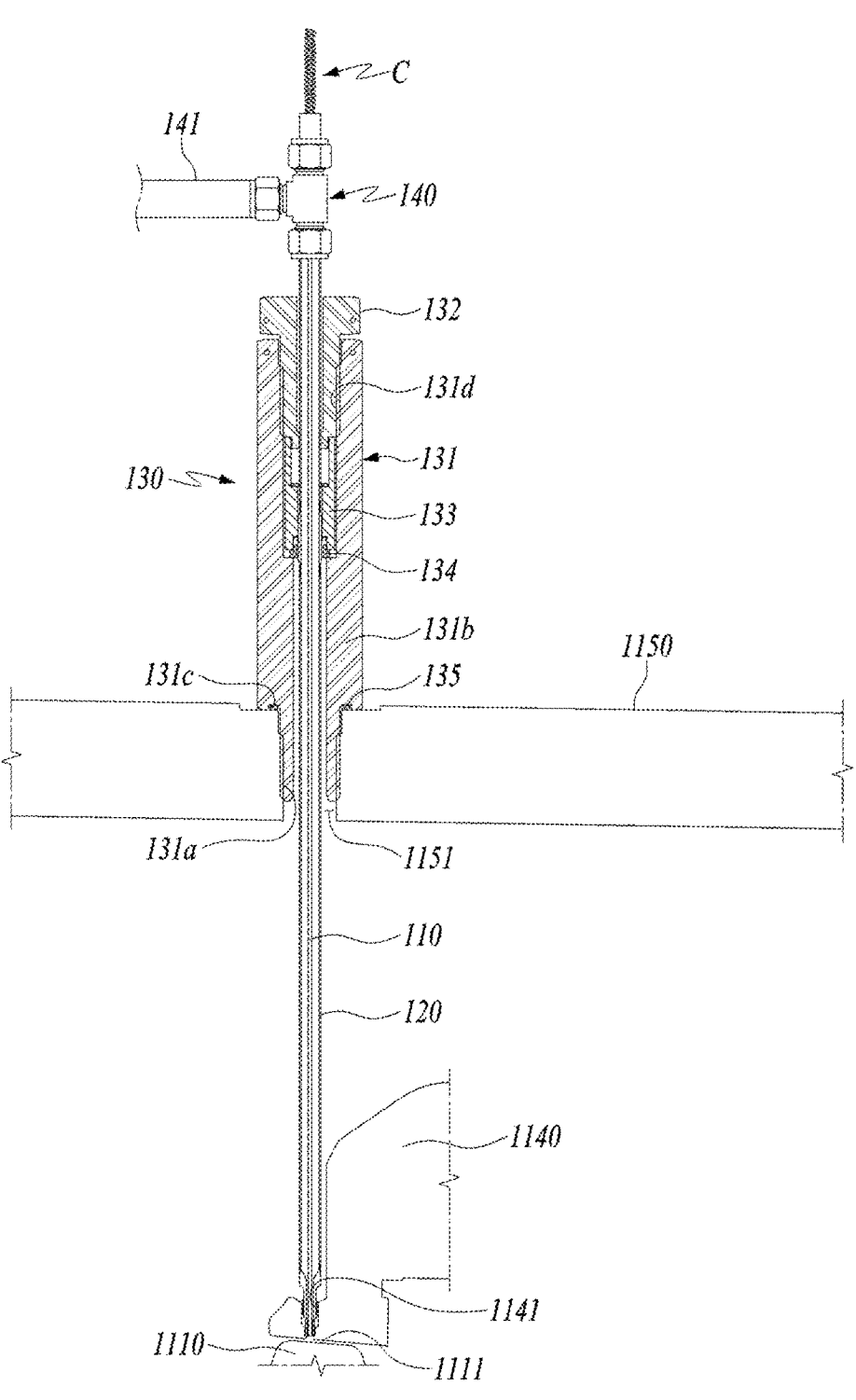
FIG. 4 is a cross-sectional view illustrating a Blade Tip Timing (BTT) probe fixing apparatus according to an embodiment of the present disclosure.
Figure 5:
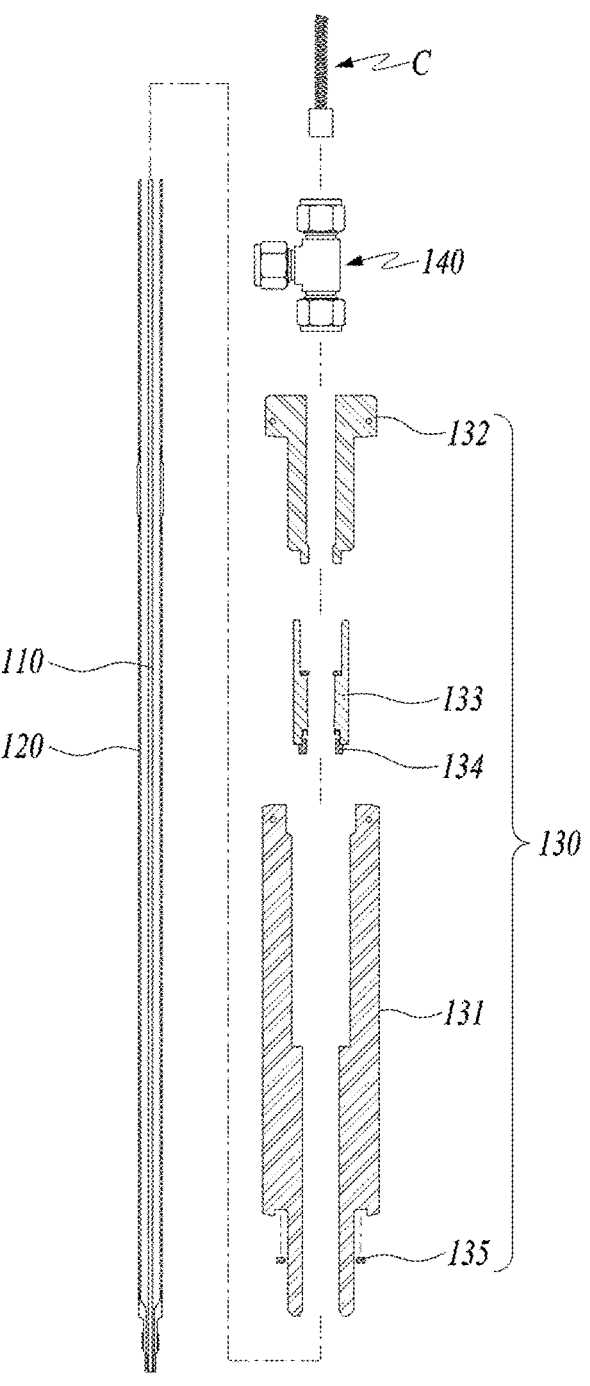
FIG. 5 is an exploded cross-sectional view illustrating the BTT probe fixing apparatus according to an embodiment of the present disclosure.

FIG. 4 is a cross-sectional view illustrating the BTT probe fixing apparatus according to an embodiment of the present disclosure, and FIG. 5 is an exploded cross-sectional view illustrating the BTT probe fixing apparatus according to an embodiment of the present disclosure.

In the description below, the blade may be the compressor blade 1110 or the turbine blade 1310. In addition, the casing may be the compressor casing 1150 or the turbine casing 1350. In addition, the vane carrier may be the compressor vane carrier 1140 or the turbine vane carrier 1340.

However, for convenience of description, the compressor blade 1110, the compressor vane carrier 1140, and the compressor casing 1150 are described as examples, but the compressor blade 1110 may be the turbine blade 1310, the compressor vane carrier 1140 may be the turbine vane carrier 1340, and the compressor casing 1150 may be the turbine casing 1350. In the turbine vane carrier 1340, the ring segment (not illustrated) may be mounted in the turbine vane carrier 1340 in a position that does not interfere with the BTT probe fixing apparatus 100.

Referring to FIG. 4 and FIG. 5, the BTT probe fixing apparatus 100 according to an embodiment of the present disclosure includes a BTT probe 110, a cooling sleeve 120, a probe holder 130, and a three-way connection port 140.

Throughout the specification, as depicted in FIGS. 1 and 2, the y-direction refers to an axial direction along an extension direction of the tie rod, z-direction refers to a radial direction having the tie rod as a radial center, and x-direction refers to a circumferential direction along a rotation direction of the blades.

An end portion of the BTT probe 110 is inserted into and fixed to a fixing hole 1141 formed in the vane carrier 1140, and the BTT probe 110 is configured to measure vibration of the blade that is a monitoring target. The BTT probe 110 is a non-contact sensor used for monitoring a state of the blade. Furthermore, the BTT probe 110 measures a time when a blade tip 1111 passes through a lower portion of the BTT probe 110, and transmits the time to a processing processor (not illustrated) through a cable C. The processing processor may analyze the state of the blade (whether the blade is cracked or damaged) by using a measurement value of the BTT probe 110, may predict a fatigue life of the blade, and may optimize a maintenance schedule. Such a BTT probe 110 may be configured in a form of a flexible optical fiber.

The cooling sleeve 120 protects the BTT probe 110 by accommodating the BTT probe 110 therein, and a cooling air introduced through the three-way connection port 140 flows downward along the BTT probe 110. The cooling air cools the BTT probe 110 so as to prevent thermal damage of the BTT probe 110, and removes foreign substances attached to a surface of the BTT probe 110 so as to increase the reliability of the operation of the BTT probe 110.

The cooling sleeve 120 is fixed at its upper end to the three-way connection port 140. At its lower end, a threaded portion formed on an outer surface of the cooling sleeve 120 and is threadably engaged (i.e., coupled) to a corresponding threaded portion formed on an inner surface of the fixing hole 1141 formed in the vane carrier 1140. Through fixation at both the upper and lower ends, the cooling sleeve 120 secures a measurement point of the BTT probe 110.

The cooling sleeve 120 is formed of a flexible material, so that the cooling sleeve 120 is capable of being bent by an external force and is capable of being restored when the external force is removed. That is, even though the vane carrier 1140 thermally expands during the operation of the gas turbine and moves toward an axial direction (i.e., a tie rod direction or a y-direction), the cooling sleeve 120 may be flexibly bent and may fix a measurement point of the BTT probe 110.

The cooling sleeve 120 may be formed of a nickel-chromium based superalloy, and may be composed of an Inconel alloy that is capable of maintaining high strength and corrosion resistance even under an extreme environment. The Inconel alloy is a material having flexibility while withstanding a high temperature and a high pressure.

The cooling sleeve 120 is slidably inserted through the probe holder 130, allowing relative movement of the cooling sleeve 120 within the probe holder 130. The probe holder 130 is configured to move in a radial direction (a z-direction) in response to thermal expansion of the casing 1150, while maintaining the fixed state of the cooling sleeve 120 and the BTT probe 110.

Specifically, the probe holder 130 includes a main body 131, a bolt portion 132, a bolt adapter portion 133, an inner gasket 134, and an outer gasket 135.

The main body 131 is generally formed in a hollow cylindrical shape and has an insertion portion 131*a* at a lower portion and a fixing portion 131*b* at an upper portion. The main body 131 further includes an outer stepped portion 131*c* between the insertion portion 131*a* and the fixing portion 131*b*. The fixing portion 131*b* includes a fastening hole 131*d* at the fixing portion 131*b*'s upper portion.

The insertion portion 131*a* is capable of being inserted into a penetration hole 1151 formed in the casing 1150. The insertion portion 131*a* has a first outer diameter.

The fixing portion 131*b* has a second outer diameter that is larger than the first outer diameter. According to an embodiment, the fixing portion 131*b* has a constant outer diameter from its upper end to its lower end.

A boundary surface between the insertion portion 131*a* and the fixing portion 131*b* forms an outer stepped portion 131*c*. In the outer stepped portion 131*c*, a portion of the outer stepped portion 131*c* positioned adjacent to the penetration hole 1151 is recessed upwardly, i.e., toward in a radially outward direction) in the z-direction. The outer gasket 135 is mounted on the recessed portion.

The outer gasket 135 is positioned between the fixing portion 131*b* and the casing 1150 and press-fitted therebetween. According to an embodiment, the outer gasket 135 seals a gap between the main body 131 and the casing 1150.

A thread is formed on an outer surface of the insertion portion 131*a* and a thread engaged with the thread of the insertion portion 131*a* is formed on an inner surface of the penetration hole 1151, so that the main body 131 and the casing 1150 are capable of being securely fastened to each other. Accordingly, the probe holder 130 may be moved together with the casing 1150 as the casing 1150 is moved.

A fastening hole 131*d* has a thread where the bolt portion 132 is capable of being fastened thereto by being inserted into the fastening hole 131*d*. The bolt portion 132 and the main body 131 may be securely fastened to each other by screw-coupling a thread of the bolt portion 132 to the thread of the fastening hole 131*d*.

In addition, the bolt adapter portion 133 is mounted on a lower portion of the bolt portion 132. A portion of a lower surface of the bolt adapter portion 133 in contact with the cooling sleeve 120 is recessed to a predetermined size, and the inner gasket 134 is mounted on the recessed portion.

The inner gasket 134 and the outer gasket 135 may be formed of a graphite material. The inner gasket 134 positioned inside the main body 131 and the outer gasket 135 positioned outside the main body 131 may prevent fluid inside the casing 1150 from leaking to the outside.

The fixing portion 131*b* has a lower portion and an upper portion. The inner diameter of the lower portion of the fixing portion 131*b* is smaller than that of the upper portion. The inner diameter of the lower portion of the fixing portion 131*b* is the same with that of the insertion portion 131*a*. The fixing portion 131*b* includes an inner stepped portion between the lower portion and the upper portion where the inner diameter of the fixing portion 131*b* changes from the inner diameter of the lower portion to the inner diameter of the upper portion.

The inner gasket 134 is mounted on between the inner stepped portion and the recessed portion of the bolt adapter portion 133 and pressed fitted therebetween. According to an embodiment, the inner gasket 134 seals a gap between the cooling sleeve 120 and the bolt adapter portion 133 and a gap between the bolt adapter portion 133 and the inner stepped portion.

The cooling sleeve 120 is inserted through the inside of the bolt portion 132 and the inside of the bolt adapter portion 133, and is mounted such that the cooling sleeve 120 is capable of being slid up and down inside the main body 131, the bolt portion 132, and the bolt adapter portion 133.

The three-way connection port 140 interconnects the cable C, the cooling sleeve 120, and a cooling air inlet port 141 to each other. The cable C is connected to the BTT probe 110 within the three-way connection port 140. The cooling air inlet port 141 is configured to introduce external air therein and to allow the external air to flow toward the cooling sleeve 120. A blocking plate for preventing the introduced air from flowing to the cable C may be mounted on an inner portion of the three-way connection port 140, the inner portion being positioned adjacent to the cable C. The introduced external air (the cooling air) may prevent the thermal damage of the BTT probe 110 by flowing along the cooling sleeve 120 and cooling the BTT probe 110, and may increase the reliability of the operation of the BTT probe 110 by removing foreign substances attached to the surface of the BTT probe 110.

Figure 6:
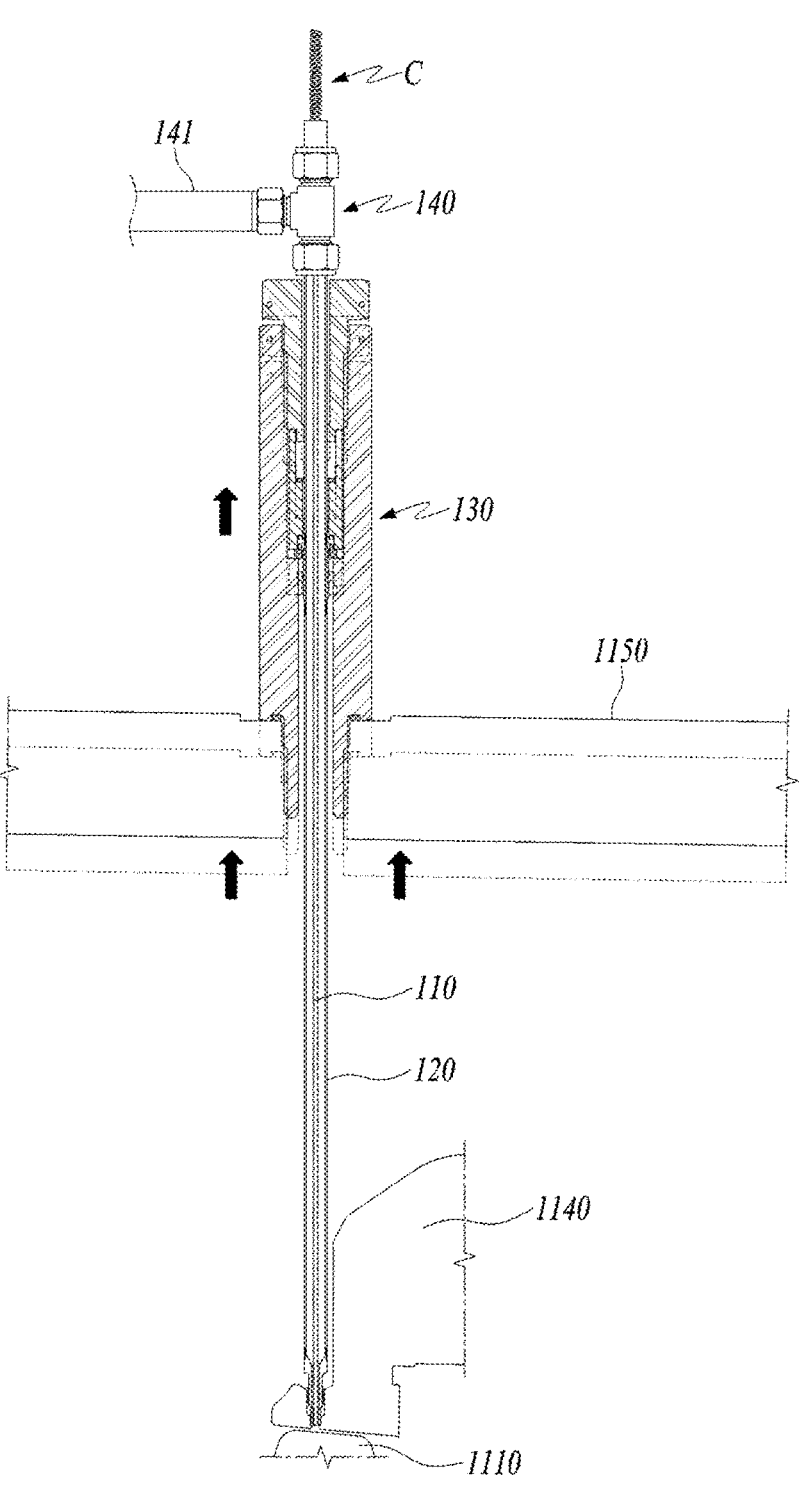
FIG. 6 and FIG. 7 are cross-sectional views illustrating an operation process of the BTT probe fixing apparatus according to an embodiment of the present disclosure.
Figure 7:
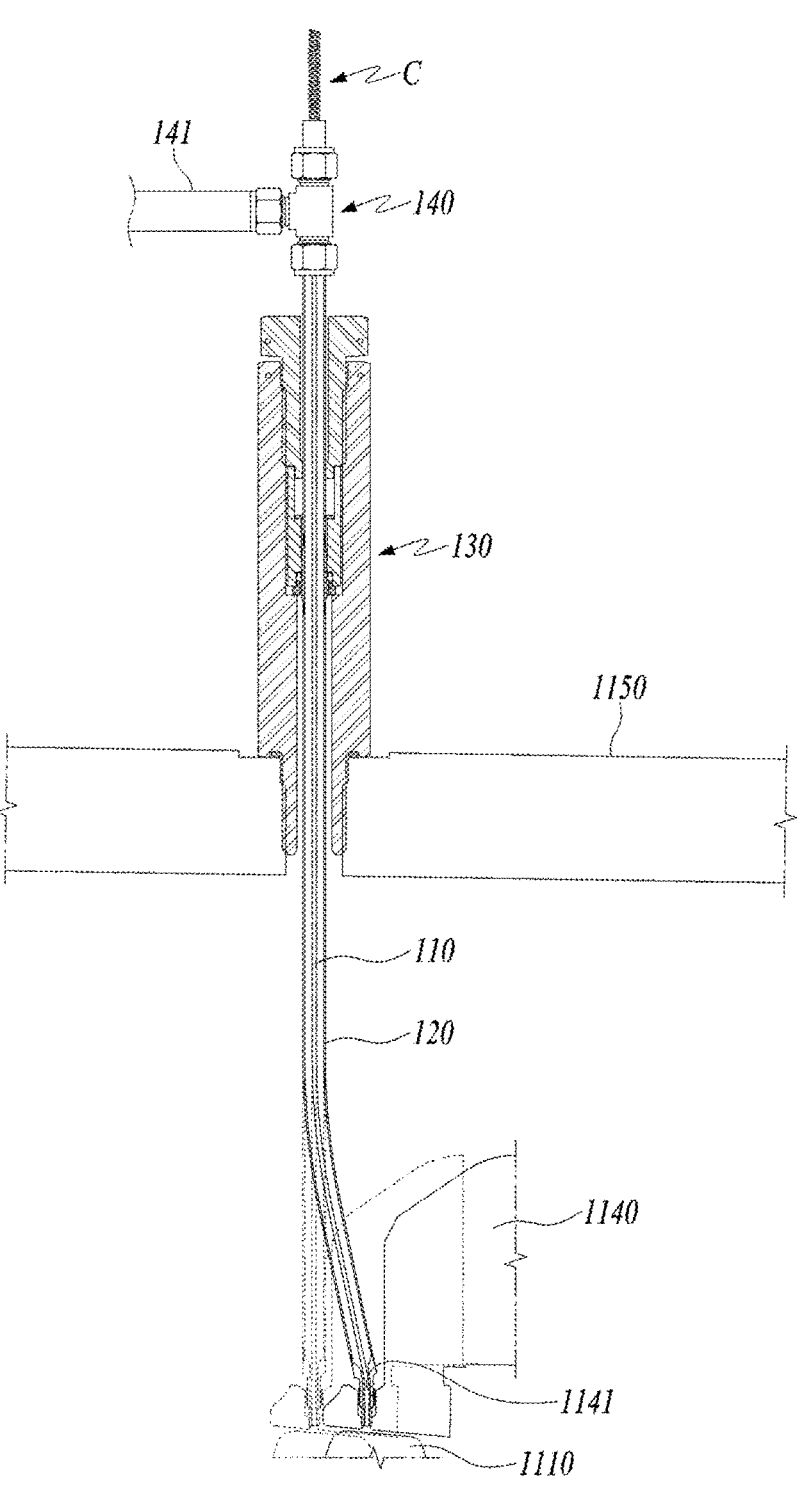

Next, an operation process of the BTT probe fixing apparatus according to an embodiment of the present disclosure will be described with reference to FIG. 6 and FIG. 7. FIG. 6 and FIG. 7 are cross-sectional views illustrating the operation process of the BTT probe fixing apparatus according to an embodiment of the present disclosure.

First, FIG. 6 shows a situation in which the casing 1150 thermally expands by heat generated during the operation of the gas turbine. By the thermal expansion, the casing 1150 moves radially outward in the radial direction (z-direction). At this time, since the main body 131 and the casing 1150 are securely fastened to each other, the probe holder 130 may be moved in the radial direction together with the casing 1150. When the probe holder 130 moves, its portions such as the main body 131, the bolt portion 132, the bolt adapter portion 133, the inner gasket 134, and the outer gasket 134 may move integrally. On the other hand, since the cooling sleeve 120 has a structure in which the cooling sleeve 120 is not fastened to the casing 1150 and the cooling sleeve 120 is capable of being slid up and down inside the probe holder 130, so that the cooling sleeve 120 may be maintained in place regardless of the movement of the probe holder 130. The BTT probe 110 accommodated in the cooling sleeve 120 may also be maintained in place.

Therefore, the BTT probe fixing apparatus 100 according to an embodiment of the present disclosure may stably fix and maintain the BTT probe 110 for monitoring the blade in real time.

Next, FIG. 7 shows a situation in which the vane carrier 1140 is moved in the axial direction (the y-direction) due to heat generated during the operation of the gas turbine. During an initial period of the operation of the gas turbine, a temperature of heat applied to the vane carrier 1140 is much higher than a temperature of heat applied to the casing 1150. Due to the difference in applied temperatures, the thermal expansion magnitudes may become different.

That is, the casing 1150 is relatively fixed, and the vane carrier 1140 may be moved in the axial direction. At this time, since the cooling sleeve 120 is formed of the flexible Inconel alloy, the cooling sleeve 120 may be bent according to the axial movement of the vane carrier 1140, so that the BTT probe 110 is stably fixed and maintained.

The BTT probe fixing apparatus 100 according to an embodiment of the present disclosure as described above may be actively modified according to a change in the position of the casing 1150 and a change in the position of the vane carrier 1140 due to heat generated during the operation of the gas turbine, so that the BTT probe 110 for monitoring the blade in real time is capable of being stably fixed and maintained.

While one or more exemplary embodiments have been described with reference to the accompanying drawings, it will be apparent to those skilled in the art that various variations and modifications may be made by adding, changing, or removing components without departing from the spirit and scope of the present disclosure as defined in the appended claims, and these variations and modifications fall within the spirit and scope of the present disclosure as defined in the appended claims. In addition, it is noted that any one feature of an embodiment of the present disclosure described in the specification may be applied to another embodiment of the present disclosure.

What is claimed is:

1. A Blade Tip Timing (BTT) probe fixing apparatus comprising:
a cooling sleeve inserted into a fixing hole formed in a vane carrier, the cooling sleeve accommodating a BTT probe measuring vibration of a blade in an inner portion of the cooling sleeve, and the cooling sleeve having a lower end thereof fastened to the fixing hole; and
a probe holder having a lower end thereof fastened to a penetration hole formed in a casing and having an inner portion where the cooling sleeve penetrates therethrough and is inserted thereinto such that the cooling sleeve is capable of being slid in the probe holder, the probe holder being configured to move according to thermal expansion of the casing while maintaining the cooling sleeve and the BTT probe in a fixed position relative to the vane carrier.

2. The BTT probe fixing apparatus of claim 1, wherein the cooling sleeve is formed of a flexible material, so that the cooling sleeve is capable of being bent by an external force and is capable of being restored when the external force is removed.

3. The BTT probe fixing apparatus of claim 1, wherein the cooling sleeve comprises an Inconel alloy.

4. The BTT probe fixing apparatus of claim 1, wherein the probe holder comprises:
a main body formed in a hollow cylindrical shape;
a bolt portion inserted into and fastened to a fastening hole formed in an upper portion of the main body; and
a bolt adapter portion mounted on a lower portion of the bolt portion inside the main body, and
wherein the cooling sleeve is mounted such that the cooling sleeve is capable of being slid up and down inside the main body, the bolt portion, and the bolt adapter portion.

5. The BTT probe fixing apparatus of claim 4, wherein the main body comprises:
an insertion portion, positioned at a lower side of the main body, which is capable of being inserted into and fastened to the penetration hole and which has a first outer diameter;
a fixing portion, positioned at an upper side of the main body, which has a second outer diameter that is larger than the first outer diameter; and
an outer stepped portion formed on a boundary surface between the insertion portion and the fixing portion.

6. The BTT probe fixing apparatus of claim 5, wherein an inner gasket is mounted on a lower surface of the bolt adapter portion, and an outer gasket is mounted between the outer stepped portion and the casing, thereby preventing leakage of fluid from inside the casing to the outside.

7. The BTT probe fixing apparatus of claim 6,
wherein the fixing portion includes an inner stepped portion, and the inner gasket is positioned between the bolt adapter portion and the inner stepped portion,
wherein the inner gasket is configured to seal a gap between the cooling sleeve and the bolt adapter portion and a gap between the bolt adapter portion and the inner stepped portion.

8. The BTT probe fixing apparatus of claim 7,
wherein the outer stepped portion includes a recessed portion recessed upwardly, and the outer gasket is positioned at the recessed portion,
wherein the outer gasket is configured to seal a gap between the main body and the casing.

9. The BTT probe fixing apparatus of claim 1, further comprising:
a three-way connection port configured to introduce external air and to direct the external air to flow toward the cooling sleeve.

10. The BTT probe fixing apparatus of claim 1,
wherein the blade is a compressor blade or a turbine blade,
wherein the vane carrier is a compressor vane carrier or a turbine vane carrier,
wherein the casing is a compressor casing or a turbine casing.

11. A gas turbine comprising:
a compressor configured to draw in and compress external air;
a combustor configured to mix fuel with air compressed in the compressor and to combust a mixture of the fuel and the compressed air;
a turbine configured to generate power by using a combustion gas discharged from the combustor; and
a Blade Tip Timing (BTT) probe fixing apparatus for fixing and maintaining a BTT probe that monitors a blade in real time,
wherein the BTT probe fixing apparatus comprises:
a cooling sleeve inserted into a fixing hole formed in a vane carrier, the cooling sleeve accommodating the BTT probe measuring vibration of the blade in an inner portion of the cooling sleeve, and the cooling sleeve having a lower end thereof fastened to the fixing hole; and a probe holder having a lower end thereof fastened to a penetration hole formed in a casing and having an inner portion where the cooling sleeve penetrates therethrough and is inserted thereinto such that the cooling sleeve is capable of being slid in the probe holder, the probe holder being configured to move according to thermal expansion of the casing while maintaining the cooling sleeve and the BTT probe in a fixed position relative to the vane carrier.

12. The gas turbine of claim 11, wherein the cooling sleeve is formed of a flexible material, so that the cooling sleeve is capable of being bent by an external force and is capable of being restored when the external force is removed.

13. The gas turbine of claim 11, wherein the cooling sleeve comprises an Inconel alloy.

14. The gas turbine of claim 11, wherein the probe holder comprises:

a main body formed in a hollow cylindrical shape;

a bolt portion inserted into and fastened to a fastening hole formed in an upper portion of the main body; and a bolt adapter portion mounted on a lower portion of the bolt portion inside the main body, and wherein the cooling sleeve is mounted such that the cooling sleeve is capable of being slid up and down inside the main body, the bolt portion, and the bolt adapter portion.

15. The gas turbine of claim 14, wherein the main body comprises:

an insertion portion, positioned at a lower side of the main body, which is capable of being inserted into and fastened to the penetration hole and which has a first outer diameter;

a fixing portion, positioned at an upper side of the main body, and which has a second outer diameter that is larger than the first outer diameter; and an outer stepped portion formed on a boundary surface between the insertion portion and the fixing portion.

16. The gas turbine of claim 15, wherein an inner gasket is mounted on a lower surface of the bolt adapter portion, and an outer gasket is mounted between the outer stepped portion and the casing, thereby preventing leakage of fluid from inside the casing to the outside.

17. The BTT probe fixing apparatus of claim 16, wherein the fixing portion includes an inner stepped portion, and the inner gasket is positioned between the bolt adapter portion and the inner stepped portion, wherein the inner gasket is configured to seal a gap between the cooling sleeve and the bolt adapter portion and a gap between the bolt adapter portion and the inner stepped portion.

18. The BTT probe fixing apparatus of claim 17, wherein the outer stepped portion includes a recessed portion recessed upwardly, and the outer gasket is positioned at the recessed portion, wherein the outer gasket is configured to seal a gap between the main body and the casing.

19. The gas turbine of claim 11, further comprising:

a three-way connection port configured to introduce external air and to direct the external air to flow toward the cooling sleeve.

20. The gas turbine of claim 11, wherein the blade is a compressor blade or a turbine blade, wherein the vane carrier is a compressor vane carrier or a turbine vane carrier, and wherein the casing is a compressor casing or a turbine casing.

* * * * *